US009926898B2

(12) United States Patent
Allen et al.

(10) Patent No.: US 9,926,898 B2
(45) Date of Patent: Mar. 27, 2018

(54) METHOD OF FILTERING FUEL

(71) Applicants: Randy R. Allen, Kearney, NE (US);
James N. Marshall, Elm Creek, NE (US)

(72) Inventors: Randy R. Allen, Kearney, NE (US);
James N. Marshall, Elm Creek, NE (US)

(73) Assignee: Baldwin Filters, Inc., Kearney, NE (US)

( * ) Notice: Subject to any disclaimer, the term of this patent is extended or adjusted under 35 U.S.C. 154(b) by 197 days.

(21) Appl. No.: 14/685,713

(22) Filed: Apr. 14, 2015

(65) Prior Publication Data
US 2015/0219049 A1 Aug. 6, 2015

Related U.S. Application Data

(62) Division of application No. 13/236,890, filed on Sep. 20, 2011, now Pat. No. 9,028,702.

(51) Int. Cl.
F02M 37/20 (2006.01)
F02M 37/22 (2006.01)
B01D 29/01 (2006.01)
B01D 29/21 (2006.01)
B01D 35/00 (2006.01)
B01D 36/00 (2006.01)

(52) U.S. Cl.
CPC ........... F02M 37/22 (2013.01); B01D 29/016 (2013.01); B01D 29/21 (2013.01); B01D 35/005 (2013.01); B01D 36/001 (2013.01); F02M 37/20 (2013.01); B01D 2201/0415 (2013.01); B01D 2201/291 (2013.01); B01D 2201/305 (2013.01); B01D 2201/316 (2013.01)

(58) Field of Classification Search
None
See application file for complete search history.

(56) References Cited

U.S. PATENT DOCUMENTS

| 4,283,289 A | 8/1981 | Meyst et al. |
| 4,721,563 A | 1/1988 | Rosaen |
| 5,382,361 A | 1/1995 | Brun |
| 5,413,711 A | 5/1995 | Janik |
| 5,449,454 A | 9/1995 | Hickok |
| 5,453,184 A | 9/1995 | Handtmann |
| 5,489,384 A | 2/1996 | Janik et al. |
| 5,525,225 A | 6/1996 | Janik et al. |
| 6,270,659 B1 | 8/2001 | Bagci et al. |

(Continued)

FOREIGN PATENT DOCUMENTS

| DE | 43 30 840 C1 | 2/1995 |
| DE | 195 19 352 A1 | 11/1996 |

(Continued)

Primary Examiner — Benjamin M Kurtz
(74) Attorney, Agent, or Firm — Reinhart Boerner Van Deuren P.C.

(57) ABSTRACT

A filter element is provided with a snorkel that facilitates bleeding of air along the outside periphery of a tubular filter media pack to a bleed chamber contained within the filter element. This may be employed in fuel filtration applications during installation and removal of filter elements whereby air can be temporarily trapped in a housing containing the filter element. The snorkel thus vents the air along the outside of the filter element and then into a bleed chamber where it can be communicated to a standpipe having an isolated bleed passage.

16 Claims, 6 Drawing Sheets

(56) References Cited

U.S. PATENT DOCUMENTS

| | | |
|---|---|---|
| 7,147,110 B2 | 12/2006 | Clausen et al. |
| 9,028,702 B2 | 5/2015 | Allen et al. |
| 2004/0211720 A1 | 10/2004 | Mack et al. |
| 2005/0167351 A1 | 8/2005 | Herman et al. |
| 2006/0053756 A1 | 3/2006 | Hawkins et al. |
| 2009/0078626 A1 | 3/2009 | Krull et al. |
| 2009/0139920 A1 | 6/2009 | Dhawale et al. |
| 2012/0187038 A1 | 7/2012 | Schick |

FOREIGN PATENT DOCUMENTS

| | | |
|---|---|---|
| DE | 195 38 883 A1 | 4/1997 |
| DE | 197 16 085 A1 | 10/1998 |
| DE | 102009043638 A1 | 3/2011 |
| FR | 2 822 395 A1 | 9/2002 |
| JP | S485088 Y1 | 2/1973 |
| JP | 58-109429 U | 7/1983 |
| JP | 60-135659 A | 7/1985 |
| JP | 60-175761 A | 9/1985 |
| JP | 2003524514 A | 8/2003 |
| JP | 2006-263639 A | 10/2006 |
| JP | 2007-501103 A | 1/2007 |
| JP | 2009-0144660 A | 7/2009 |
| JP | 2010-000501 A | 1/2010 |
| JP | 2011-0032992 A | 2/2011 |
| JP | 2013-505826 A | 2/2013 |
| KR | 1998-0046233 A | 9/1998 |
| KR | 2000-0070796 A | 11/2000 |
| WO | WO 01/85304 A1 | 11/2001 |
| WO | WO 02/076568 A1 | 10/2002 |
| WO | WO 2004/096410 A1 | 11/2004 |

METHOD OF FILTERING FUEL

CROSS-REFERENCE TO RELATED PATENT APPLICATIONS

This patent application is a divisional of co-pending U.S. patent application Ser. No. 13/236,890, filed Sep. 20, 2011, which is now pending, the entire teachings and disclosure of which are incorporated herein by reference thereto.

FIELD OF THE INVENTION

The present invention generally relates to fluid filters, and more particularly relates to apparatus and methods for venting air through such fuel filters and/or associated housings such as fuel filters where air can be trapped during the replacement of the filter cartridge and must be vented back to the fuel tank or otherwise to provide for good operation.

BACKGROUND OF THE INVENTION

In the fuel systems for vehicles, a pump is provided to move fuel through the system from the fuel tank to the engine. Along that path, a fuel filter comprising a filter element contained in a housing is often provided to filter out contaminants and thereby remove the same from the fuel prior to the fuel reaching the engine. Periodically, these fuel filter elements need to be changed. During initial installation and during periodic filter changes, air can be trapped in the housing and fill part of the volume of the housing. The trapped air can decrease the performance of the filter and fuel flow. As such, it is desirable to remove the trapped air from the housing.

One known method for doing the same is by means of a vent passage that leads back to the fuel tank. A prior art example employing the same is U.S. Pat. No. 7,147,110 in which the venting is through the core of the filter element. However, this design has a very complex and difficult support core within the filter element and further requires a special one-piece grommet such that off the shelf grommets cannot be readily employed. Thus, improvements over the state of the art are desired.

BRIEF SUMMARY OF THE INVENTION

One aspect of the present invention is directed toward a filter element comprising top and bottom end caps with the bottom end cap defining a central opening. A tubular ring of filter media extends between the top and bottom end caps. The tubular ring of filter media defines a central open volume. A bleed chamber is defined proximate the bottom end cap. A snorkel is in fluid communication with the bleed chamber and extends along the outside of the filter media with a vent opening closer to the top end cap, than the bottom end cap, which may be used to vent air in a housing when in use.

Another aspect pertains to this filter element in combination with a housing to provide a filter apparatus. Such apparatus comprises a housing including an inlet and an outlet adapted to filter fuel. A standpipe extends from the base of the housing toward a top of the housing. A fuel path extends from the inlet to the outlet and through the standpipe through the housing. The standpipe includes a first passage along the fuel flow path and a separately defined second bleed passage. The filter element is disposed in the housing and over the standpipe. The filter element comprises a top end cap and a bottom end cap below the top end cap. The bottom end cap defines a central opening receiving the standpipe therethrough. The tubular ring of filter media extends between the top and bottom end caps and also defines a central opening receiving the standpipe. A flow path is provided for fuel flow through the filter media. The bleed chamber is proximate the bottom end cap and in fluid communication with the second bleed passage. The snorkel is in fluid communication with the bleed chamber and extends along the outside of the filter media with the vent opening provided closer to the top end cap than the bottom end cap so that air may bleed through the snorkel, then into the bleed chamber where it may then be received in the bleed passage of the standpipe and housing.

Another aspect of the present invention is directed toward a method of filtering fuel while venting air through a filter element installed in a housing. The method comprises filtering fluid through the filter media of the filter element; venting air trapped in the housing through a snorkel integrally part of the filter element; and extending the snorkel along the outside periphery of the filter media.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
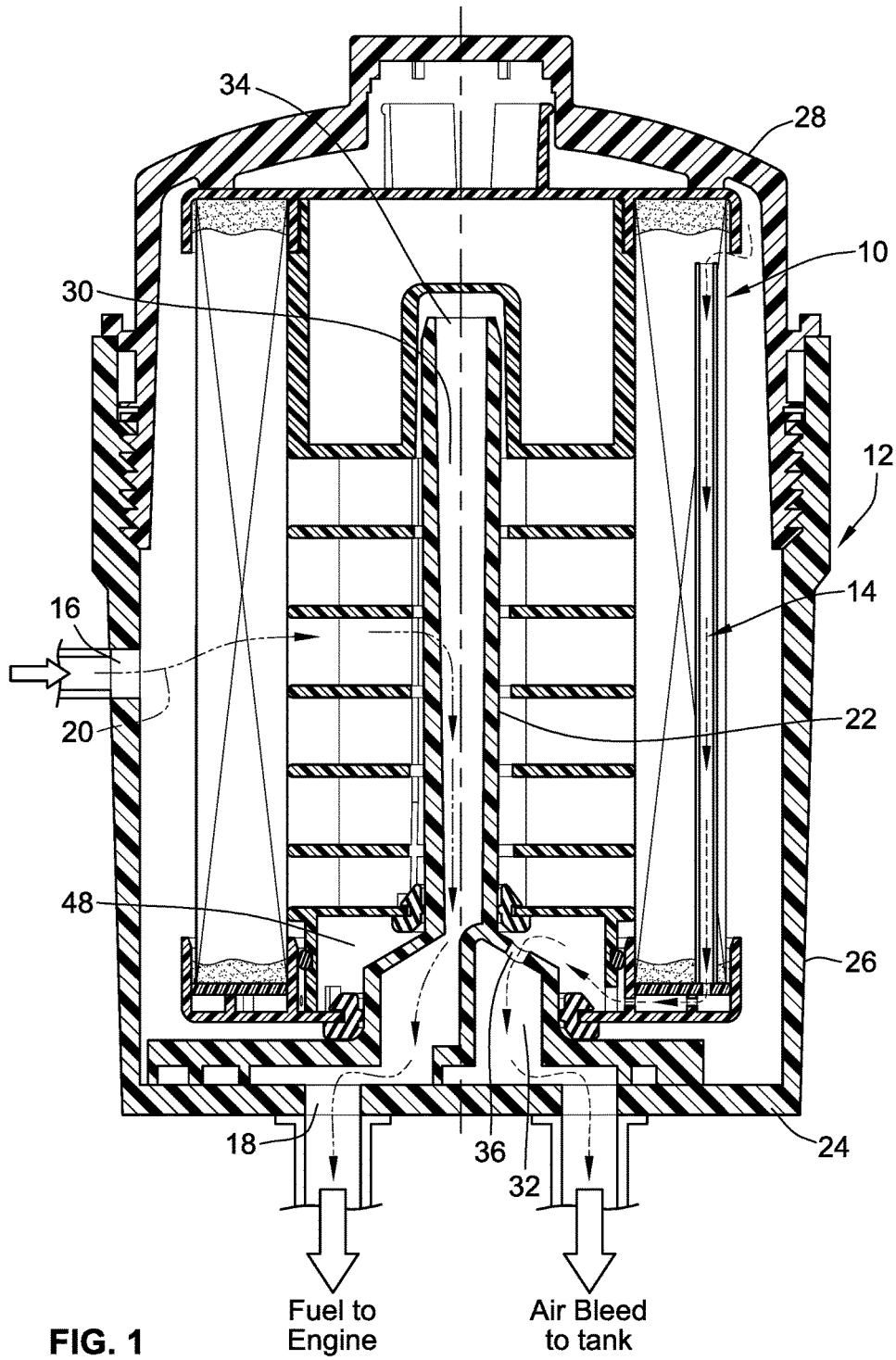
FIG. 1 is a cross-section of a filter apparatus including a housing and a filter element in accordance with an embodiment of the present invention.
Figure 2:
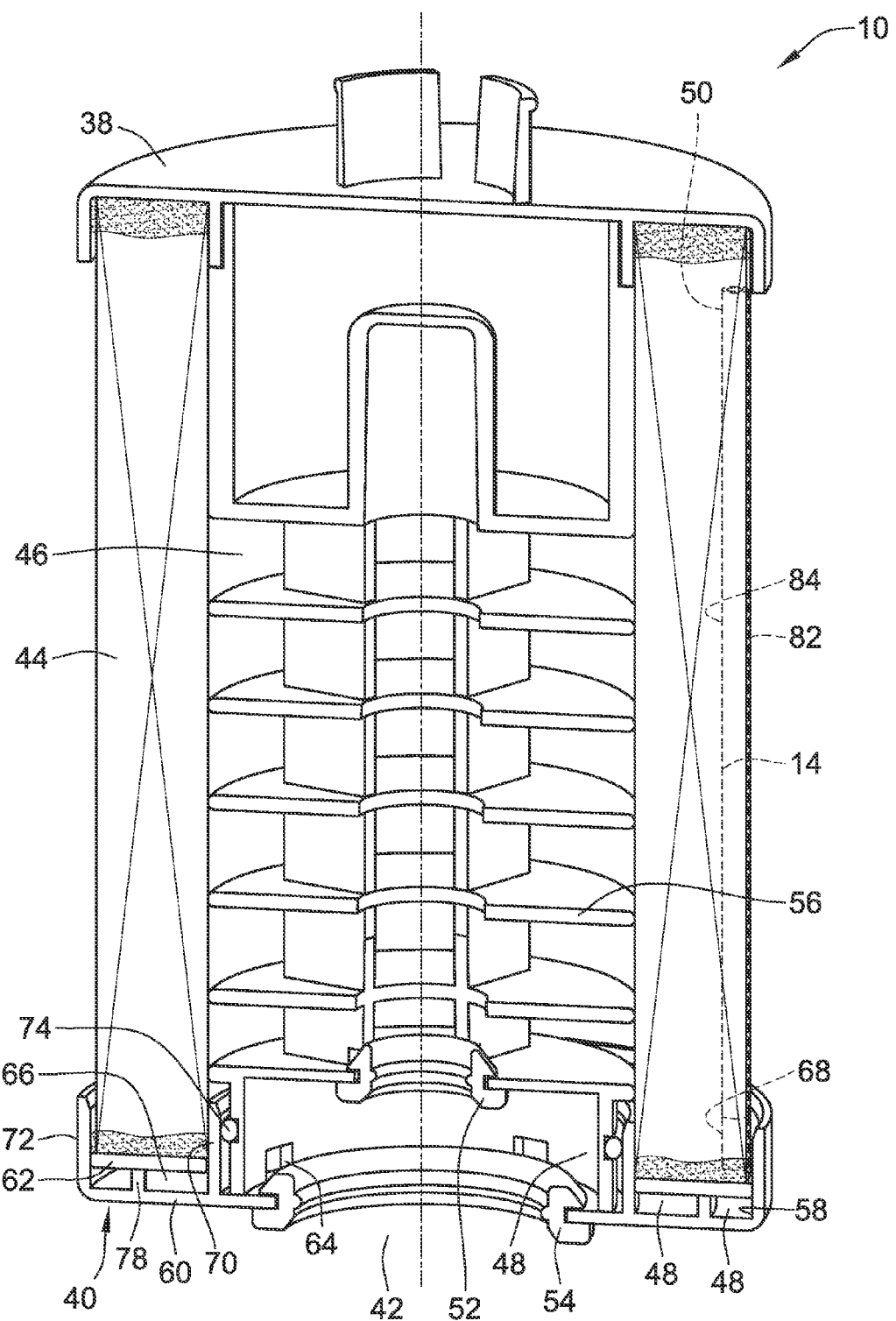
FIG. 2 is an isometric view of the filter element of FIG. 1 shown alone according to an embodiment of the present invention with the isometric view shown in cross-section.
Figure 3:
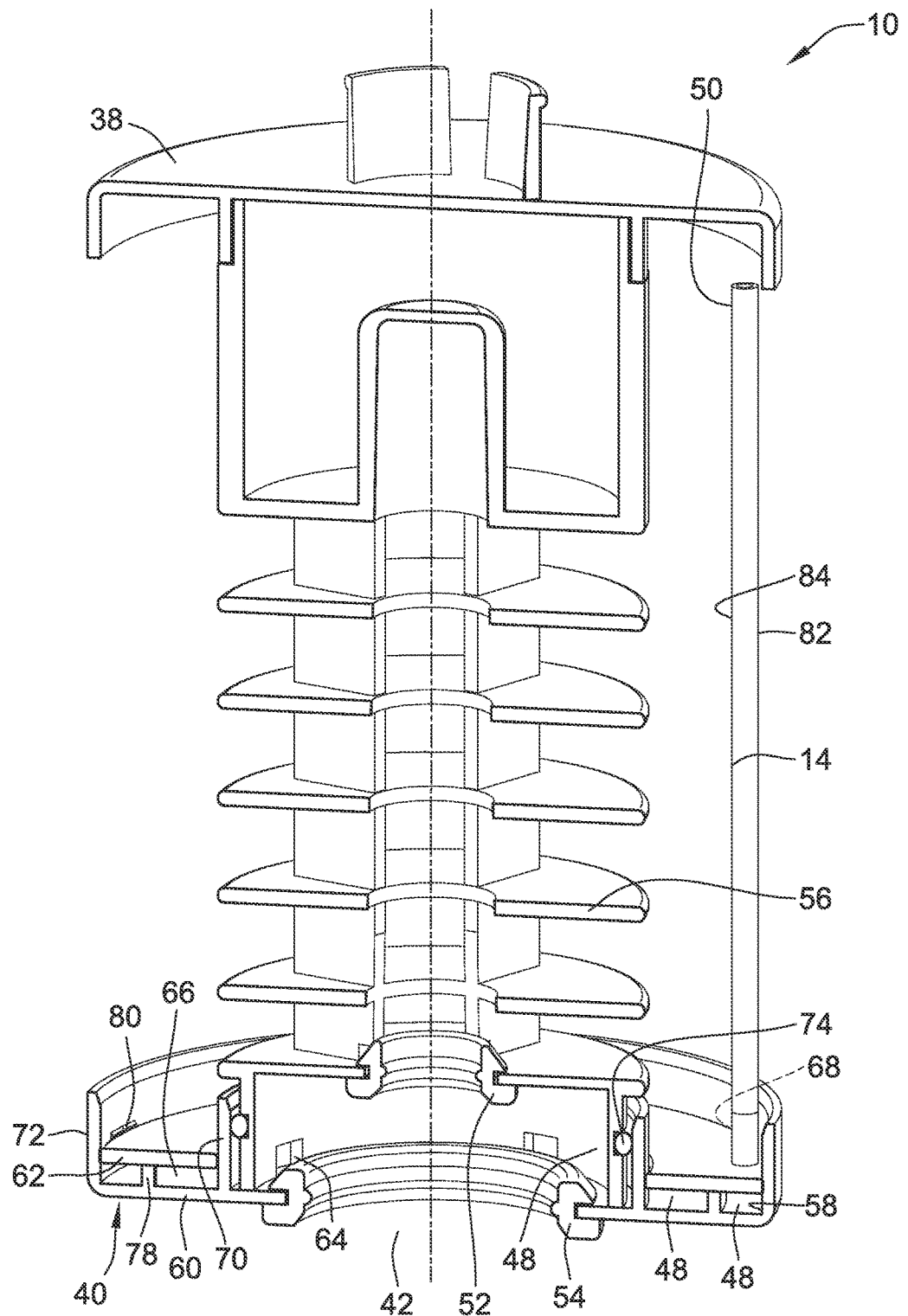
FIG. 3 is a similar, but isometric cross-section view as that of FIG. 2, but with the filter media ring removed.
Figure 4:
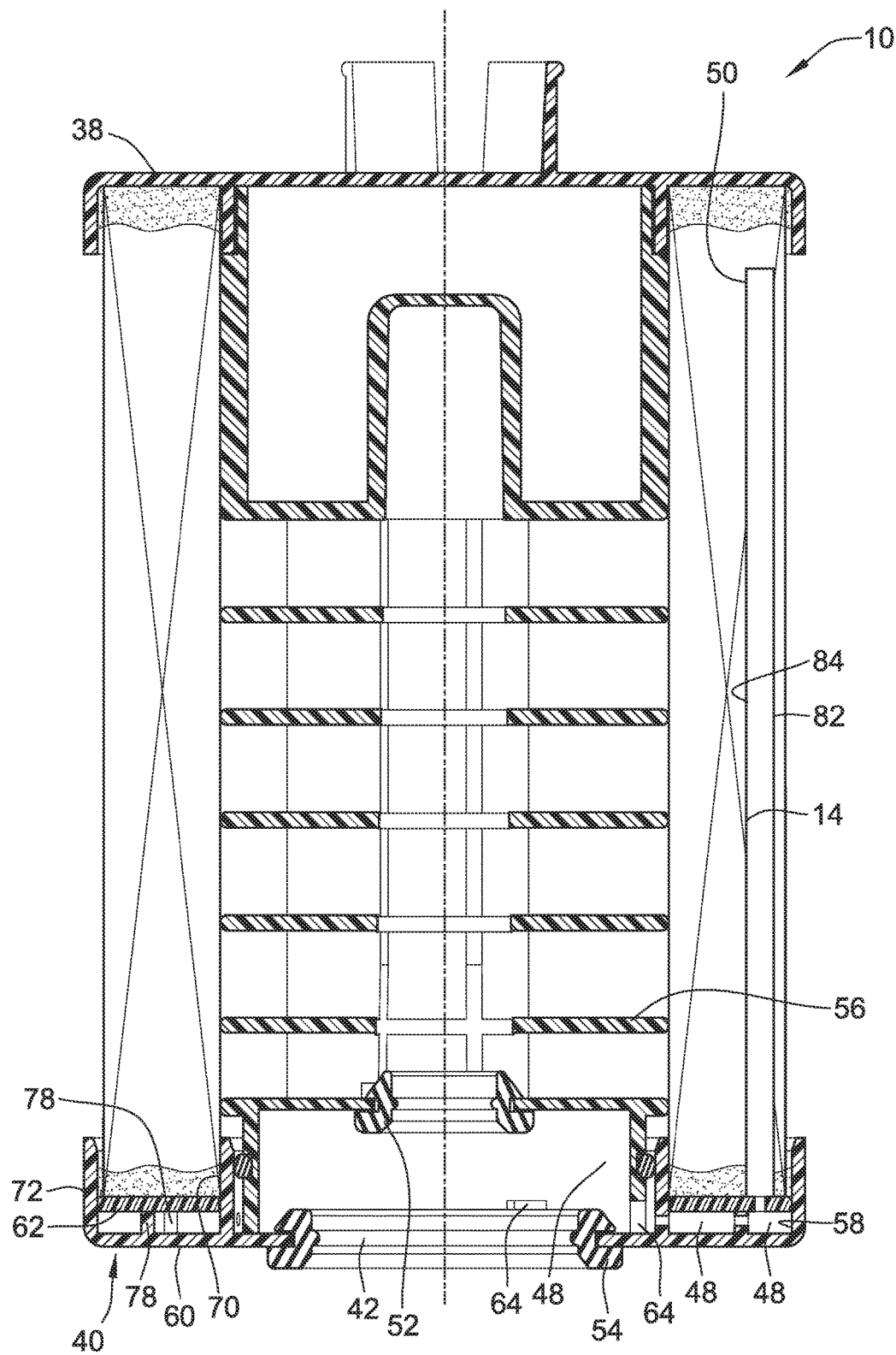
FIG. 4 is a cross-section view similar to FIG. 3, but not from an isometric view, but from a side elevation view.
Figure 5:
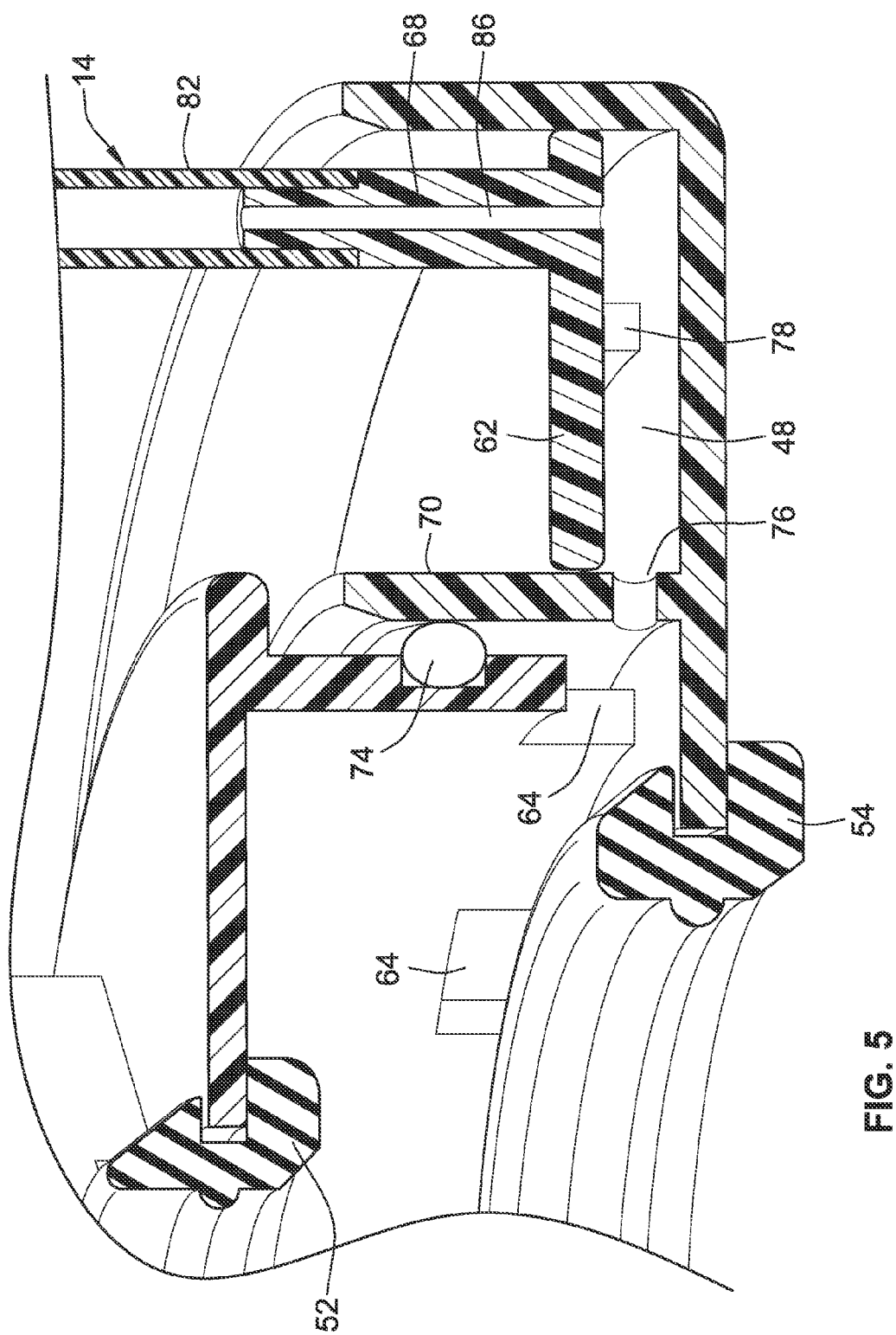
FIG. 5 is an enlarged cross-section of part of the filter element to better illustrate the snorkel and the bleed chamber in pathways therethrough.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

A first embodiment is illustrated in FIGS. 1-5, showing a filter element 10 installed in a housing 12. As illustrated and described herein, the filter element 10 includes a snorkel 14 that facilitates bleeding of much of the air that is trapped in the housing during initial installation or replacement of the filter element. The snorkel 14 facilitates bleeding of air out of the housing and back to a fuel tank or otherwise outside the housing 12.

The housing 12 includes a fuel inlet 16 and a fuel outlet 18 with a fuel flow path 20 for delivering fuel flow to an engine. The fuel flow path 20 is illustrated schematically extending from the inlet 16 to the outlet and through the filter element for filtration of contaminants. A standpipe 22 extends from a base 24 of the housing 12 toward the top end of the housing. To facilitate installation and removal, the housing 12 may comprise a container bottom 26 including the base 24 as well as a screw-on cover 28 that threadably mounts and seals the top side of the container bottom 26. In this manner, the cover 28 can be removed to facilitate removal and replacement of the filter element 10.

The fuel flow path 20 extends through the standpipe 22 along a first passage 30 defined in the standpipe. The standpipe further defines a second air bleed passage 32 that is defined separately and isolated from the first passage 30. The first passage 30 includes an inlet port 34 toward a top end of the standpipe along a smaller diameter section of the standpipe while the second air bleed passage includes a separate isolated inlet port 36 connected to the second air bleed passage 32 along a conical section that joins the smaller diameter section of the standpipe to a larger diameter section of the standpipe at the bottom end. The standpipe 22 facilitates and provides isolation structure between the first passage and the second air bleed passage so that filter fuel passing through the filter element is directed toward the engine while the air or unfiltered fuel carried along this path may be recirculated back to the tank or otherwise exits the housing 12.

As illustrated, the filter element 10 is disposed in the housing 12 and over the standpipe 22. The filter element includes a top end cap 38 and a bottom end cap 40 that is disposed below the top end cap. The bottom end cap 40 defines a central opening 42 that receives the standpipe therethrough. The tubular ring of filter media 44 (which may be a cylindrical tube of pleated filter media) extends between the top and bottom end caps 38, 40. The tubular ring of filter media defines a central open volume 46 that receives the standpipe and provides for flow along the flow path 20 through the filter media. As the flow path passes through the filter media 44, the filter media filters the fuel flowing along that flow path. The bleed chamber 48 is provided proximate the bottom end cap 40 and is preferably defined in part, by the bottom end cap. The bleed chamber 48 is therefore in fluid communication with the second bleed passage 32 of standpipe 22. The snorkel 14 is in fluid communication with this bleed chamber 48 and extends along the outside of the filter media 44 with a vent opening 50 closer to the top end cap then the bottom end cap and preferably very close to the top end cap to facilitate removal of most of the air from the housing during installation or replacement of the filter element 10 and, thereby, maximize the filtration capacity usage of the filter.

The filter element 10 also preferably includes first and second annular seals 52, 54 proximate the bottom end cap. As illustrated, the bleed chamber 48 is defined at least in part between these annular seals 52, 54 with the seals serving to seal off the bleed chamber from the filter fuel flow.

Additionally, the filter element preferably includes a support core 56 that extends between bottom and top end caps. The support core can radially support the filter media against the flow and flow restriction caused by the media as flow passes through it.

As illustrated, the first seal 52 is of smaller diameter than the second seal 54, with the first seal 52 mounted to the support core 56 (on an inward flange thereof) and the second seal 54 mounted to the bottom end cap 40. The first smaller annular seal 52 can seal on the smaller diameter section of the standpipe while the second larger annular seal 54 can seal on the larger diameter section of the standpipe. With these seals, the bleed chamber is along the outside of the standpipe.

The bottom end cap may be constructed of one or more component parts. This bottom end cap 40 embodiment includes an annular channel 58 that facilitates potting of the filter media 44 to the bottom end to sealingly bond the bottom end of the filter media. The annular channel 58 extends along a bottom 60 with a ring name member 62 spaced from the bottom 60 and providing a raised floor for the bottom end cap 40. As illustrated, the bleed chamber 48 extends through a first aperture 64 in the support core (a plurality of such vent apertures 64 may be provided) and through a vent aperture 76 (see FIG. 5) in the inner wall 70 of the bottom end cap into an annular space 66 defined between the bottom 60 and the ring member 62. The ring member 62 may be molded to include an integrally formed spout 68 extending upwardly to which the snorkel 14 is mounted.

Further, the bottom end cap may also include an inner annular wall 70 and an outer annular wall 72. Further, a third annular seal 74 may be provided to seal between the support core 56 and the bottom end cap (particularly the inner annular wall of the bottom end cap). A further vent orifice 76 is provided in the inner annular wall 70 to communicate the bleed chamber 48 into the annular space 66. Spacer element 78, which may be either integral with the bottom 60 or the ring member 62 (shown as integral in this embodiment with bottom 60) may be provided between the bottom 60 and the ring member 62 provide for spacing. Spacer elements 78 may comprise spared tabs angularly spaced about the central axis and opening so that fluid can pass radially without restriction past the spacer elements. Further, snap retainers 80 may be provided on at least one of the outside annular wall 72 and/or the inside annular wall 70, which provide for snap in retention of the ring member 62 with abutment of spacing elements 78.

Potting compounds such as Plastisol, urethanes, or other adhesive may be used to sealingly bond the opposed axial ends of the tubular ring of filter media 44 to the respective top and bottom end caps 38, 40. An advantage of using potting compound in this embodiment is that it may seal the cracks between the ring member 62 and the inner and outer annular walls 70, 72 of the bottom end cap 40.

The tubular ring of filter media 44 may be a generally cylindrical pleat pack having pleats. In this embodiment, there is featured the provision of installing the snorkel 14, which may comprise an elongated, vertically extending tube 82, mounted on spout 68 in a telescopic interfitting manner. Further, the snorkel and tube may extend in a longitudinal gap 84 between adjacent pleats of the tubular ring of media 44. Thus, snorkel tube 82 is along the outside of the pleated filter pack, but yet contained radially inward of the outer peripheries of the top and bottom end caps. Further, the top end cap may be a solid structure and no opening need be provided therein, and the second end cap may define a restriction orifice 86, which may be integral with the spout 68 structure that serves to limit the flow rate through the snorkel to allow for venting of air, but not causing excess return flow of fuel to tank.

With this arrangement and according to various embodiments, a method of filtering fuel is provided while venting air through a filter element that is installed in a housing comprising filtering fluid through filter media of the filter element; venting air trapped in the housing through a snorkel integrally part of the filter element; and extending the snorkel along the outside periphery of the filter media.

Further, a bleed chamber may be sealed around the standpipe that extends into the filter element and underneath the tubular ring of filter media with the bleed chamber being formed into the filter element. In this manner, vented air can be communicated into the seal bleed chamber in sealed isolation in relation to the filtered fluid.

Figure 6:
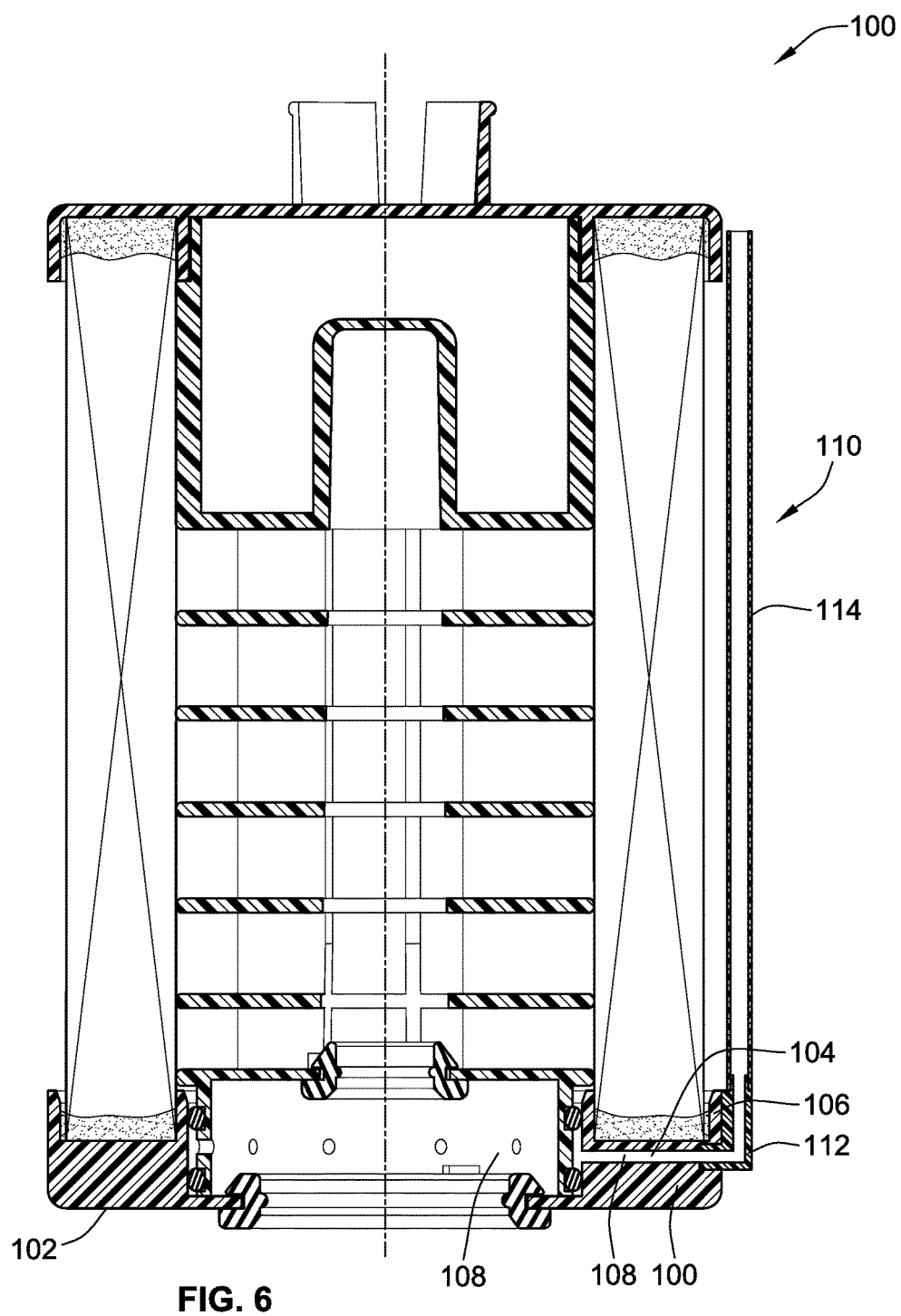
FIG. 6 is an isometric cross-section view of a filter element according to another embodiment of the present invention.

Another embodiment, similar to the first, is shown in FIG. 6 showing a filter element 100 that is in all aspects similar to filter element 10 with some distinctions pointed out herein. As such, prior structures and functions above will not be repeated, but can apply to this embodiment. Filter element 100 includes a bottom end cap 102 with a horizontal pipe and/or passage 104 extending through the outer annular wall 106. Thus, the bleed chamber 108 provided on the inner annular wall of bottom end cap 102 extends through the horizontal pipe or passage 104 to the outer periphery of the bottom end cap. Bleed chamber 108, thereby, also extends underneath the tubular ring of filter media. Potting compound may be also employed in the bottom end cap and annular channel (above the passage 104), thereof, to facilitate potting. In this embodiment, the snorkel 110 is provided along the outside of the bottom end cap and extends to the outside peripheries of the top and bottom end caps. The snorkel 110 includes a snorkel connection 112 plugged into the horizontal pipe, or passage 104, with a vertically extending snorkel tube 114 extending vertically upward and all the way to the top end cap to thereby provide for air bleed through the snorkel and into the bleed chamber.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of filtering fuel while venting air through a filter element installed in a housing, comprising:
   filtering fuel through filter media of the filter element;
   venting air trapped in the housing through a snorkel integrally part of the filter element;
   extending the snorkel along an outside periphery of the filter media;
   sealing a bleed chamber around a standpipe that extends into the filter element to receive filtered fuel, the bleed chamber being formed in the filter element;
   communicating the vented air into the sealed bleed chamber in sealed isolated relation to the filtered fluid.

2. The method of claim 1, further comprising: providing a bottom end cap at a bottom end of the filter media, the bottom end cap having a bottom and a raised floor spaced from the bottom, and extending the sealed bleed chamber into a space between the raised floor and the bottom.

3. The method of claim 1, further comprising: constraining the snorkel to an inside periphery of top and bottom end caps at opposed ends of the filter media.

4. A method of filtering fuel while venting air through a filter element installed in a housing, comprising:
   filtering fuel through filter media of the filter element;
   venting air trapped in the housing through a snorkel integrally part of the filter element;
   extending the snorkel along an outside periphery of the filter media,
   wherein the filter element comprises a top end cap; a bottom end cap below the top end cap and defining a central opening receiving a standpipe therethrough; and the filter media comprising a tubular ring of filter media extending between the top and bottom end caps, the tubular ring of filter media defining a central open volume receiving the standpipe; and
   wherein the tubular ring of filter media is a pleated filter media comprising vertically extending pleats, and wherein the snorkel extends vertically between adjacent pleats of the vertically extending pleats.

5. A method of filtering fuel, comprising:
   installing a filter element on a standpipe within a filter housing, the standpipe including a first passage for clean fuel and a second passage for at least one of air and unfiltered fuel, the filter element comprising a top end cap; a bottom end cap below the top end cap and defining a central opening receiving the standpipe therethrough; a tubular ring of filter media extending between the top and bottom end caps, the tubular ring of filter media defining a central open volume receiving the standpipe;
   filtering fuel through the filter element to generate a clean fuel flow through the first passage;
   venting air contained in the filter housing through the second passage through a bleed conduit in the filter element that extends at least partially outside of the central open volume.

6. The method of claim 5, wherein the tubular ring of filter media is a pleated filter media comprising vertically extending pleats, and wherein a snorkel extends vertically between adjacent pleats of the vertically extending pleats and has an entrance opening that is closer to the top end cap than the bottom end cap.

7. The method of claim 5, wherein the top end cap is imperforate without any openings to the central volume.

8. The method of claim 5, further comprising sealing along the standpipe at vertically spaced locations above and below a bleed port and connecting the bleed conduit to a chamber disposed between the vertically spaced locations.

9. The method of claim 5, further comprising venting around a bottom end of the tubular ring of filter media.

10. The method of claim 5, wherein the tubular ring of filter media defines an inner diameter and an outer diameter, and wherein the venting extends through a region between the inner diameter and the outer diameter.

11. A method of filtering fuel, comprising:

installing a filter element on a standpipe within a filter housing, the standpipe including a first passage for clean fuel and a second passage for at least one of air and unfiltered fuel, the filter element comprising a top end cap; a bottom end cap below the top end cap and defining a central opening receiving the standpipe therethrough; a tubular ring of filter media extending between the top and bottom end caps, the tubular ring of filter media defining a central open volume receiving the standpipe, the tubular ring of filter media defines an inner diameter and an outer diameter;

filtering fuel through the filter element to generate a clean fuel flow through the first passage;

venting air contained in the filter housing at least partially through a region extending radially between the inner diameter and the outer diameter of the tubular ring of filter media.

12. The method of claim 11, wherein the venting is through a conduit provided by the filter element, such that during removal of the filter element, the conduit is removed therewith.

13. The method of claim 12, wherein said venting comprises venting around a bottom end of the tubular ring of filter media.

14. The method of claim 12, further comprising supporting an inner periphery of the tubular ring of filter media with a support core during said filtering, and wherein the conduit is routed in spaced relation to the support core.

15. The method of claim 11, wherein the top end cap is imperforate without any openings to the central open volume.

16. The method of claim 11, wherein the tubular ring of filter media is a pleated filter media comprising vertically extending pleats, and wherein a snorkel extends vertically between adjacent pleats of the vertically extending pleats and has an entrance opening that is closer to the top end cap than the bottom end cap.

\* \* \* \* \*